United States Patent [19]

Omori et al.

[11] 4,268,910

[45] May 19, 1981

[54] METHOD FOR CONTROLLING TIMING OF SPARK IGNITION FOR AN INTERNAL COMBUSTION ENGINE BY FEEDBACK RELATED TO THE DETECTION OF KNOCKING

[75] Inventors: Norio Omori; Hideya Fujisawa, both of Kariya; Yutaka Kawashima, Okazaki; Masakazu Ninomiya, Kariya; Hisasi Kawai, Toyohashi; Takeshi Matsui, Aichi, all of Japan

[73] Assignees: Nippondenso Co., Ltd., Kariya; Nippon Soken, Inc., Nishio, both of Japan

[21] Appl. No.: 969,496

[22] Filed: Dec. 14, 1978

[30] Foreign Application Priority Data

Dec. 16, 1977 [JP] Japan .................................. 52-152023

[51] Int. Cl.³ ........................... F02P 5/14; F02P 17/00
[52] U.S. Cl. .................................... 364/431; 123/416; 123/425; 364/508
[58] Field of Search ............................. 364/431, 508; 123/198 E, 198 R, 415, 416, 425, 431, 435, 436, 440; 73/35

[56] References Cited

U.S. PATENT DOCUMENTS

| | | | |
|---|---|---|---|
| 2,220,558 | 11/1940 | Van Dijck et al. | 123/198 R |
| 2,401,563 | 6/1946 | Hersey | 123/425 |
| 2,407,652 | 9/1946 | Costa | 123/198 E |
| 3,816,717 | 6/1974 | Yoshida et al. | 123/440 |
| 3,853,103 | 12/1974 | Wahl et al. | 123/416 |
| 3,875,912 | 4/1975 | Bullo | 123/425 |
| 4,002,155 | 1/1977 | Harned et al. | 123/416 |
| 4,061,116 | 12/1977 | Saida et al. | 123/415 |
| 4,063,538 | 12/1977 | Powell et al. | 123/425 |
| 4,092,955 | 6/1978 | Reddy | 364/431 |
| 4,120,272 | 10/1978 | Douaud et al. | 123/416 |
| 4,133,320 | 1/1979 | Bianchi et al. | 123/436 |
| 4,133,475 | 1/1979 | Harned et al. | 123/425 |
| 4,153,020 | 5/1979 | King et al. | 123/425 |
| 4,161,162 | 7/1979 | Latsch et al. | 123/435 |

FOREIGN PATENT DOCUMENTS 2510526  9/1976  Fed. Rep. of Germany ...... 123/425

Primary Examiner—Felix D. Gruber
Attorney, Agent, or Firm—Cushman, Darby & Cushman

[57] ABSTRACT

The timing of spark ignition is set in normal operating conditions at a programed spark advance angle corresponding to the MBT (minimum spark advance for best torque). When knocking of the engine is detected by a vibration sensor, the ignition timing is delayed by a predetermined amount, e.g., $2\Delta\theta$, for each engine cycle that knocking is detected in synchronism with the rotation of the engine. When knocking is not detected, the ignition timing is advanced by another predetermined amount, for each engine cycle that knocking is not detected. e.g., $\Delta\theta$. In this method for controlling the spark timing, the amount of retardation, $2\Delta\theta$, is selected to be larger than the other amount of advance, $\Delta\theta$.

3 Claims, 13 Drawing Figures

METHOD FOR CONTROLLING TIMING OF SPARK IGNITION FOR AN INTERNAL COMBUSTION ENGINE BY FEEDBACK RELATED TO THE DETECTION OF KNOCKING

BACKGROUND OF THE INVENTION

1. Field of the Invention

The present invention relates to ignition timing control systems for spark ignition internal combustion engines (hereinafter simply referred to as an engine), and more particularly, to such a method in which the spark timing is controlled by feedback related to the presence or absence of knocking.

2. Description of the Prior Art

With known engines, to ensure effective development of the engine torque, it is generally preferable to control the ignition timing in such a manner that it is advanced to a spark angle which produces the maximum torque (i.e., MBT or Minimum Spark Advance for Best Torque). However, it has been known that knocking will occur if the spark ignition timing is advanced excessively and that the critical knock spark advance at which knocking occurs will be less than the MBT depending on the engine conditions. Thus there is a range in which knocking will be caused when the ignition timing is advanced to the MBT. There is another disadvantage that since the critical knock spark advance varies depending on the engine conditions, the octane number of the fuel used and the presence of deposits in the combustion chamber, the actual ignition timing is inevitably advanced to an angle considerably less than the MBT, thus making it impossible to develop a sufficient torque.

SUMMARY OF THE INVENTION

In the present invention, the existence of knocking in the engine is detected for each combustion cycle to effect feedback control to advance the ignition timing up to the critical knock spark advance when the critical knock advance is less than the MBT. When the engine is operating at a speed and with such a load that knocking will occur at or below the MBT the spark timing is incrementally retarded (from the previously calculated timing) each time knocking is detected, and incrementally advanced each time knocking is not detected. Furthermore, the angle by which the ignition timing is incrementally retarded, upon detection of knocking, is greater than the angle by which the ignition timing is incrementally advanced when no knocking is detected. Thus when knocking is detected, the occurrence of knocking in the next combustion is positively prevented.

The invention has among its great advantages the fact that the angle by which the ignition timing is correctively, incrementally, retarded upon detection of knocking in synchronism with the ignition timing is set to a value greater than that by which the ignition timing is correctively incrementally advanced when no knocking is detected, whereby not only the development of a sufficient torque is ensured, but also after the detection of knocking, the occurrence of knocking in the next combustion cycle is positively prevented, thus greatly reducing the number of engine cycles in which knocking occurs.

DESCRIPTION OF THE PREFERRED EMBODIMENTS

The present invention will now be described in greater detail with reference to the accompanying drawings.

Figure 1:
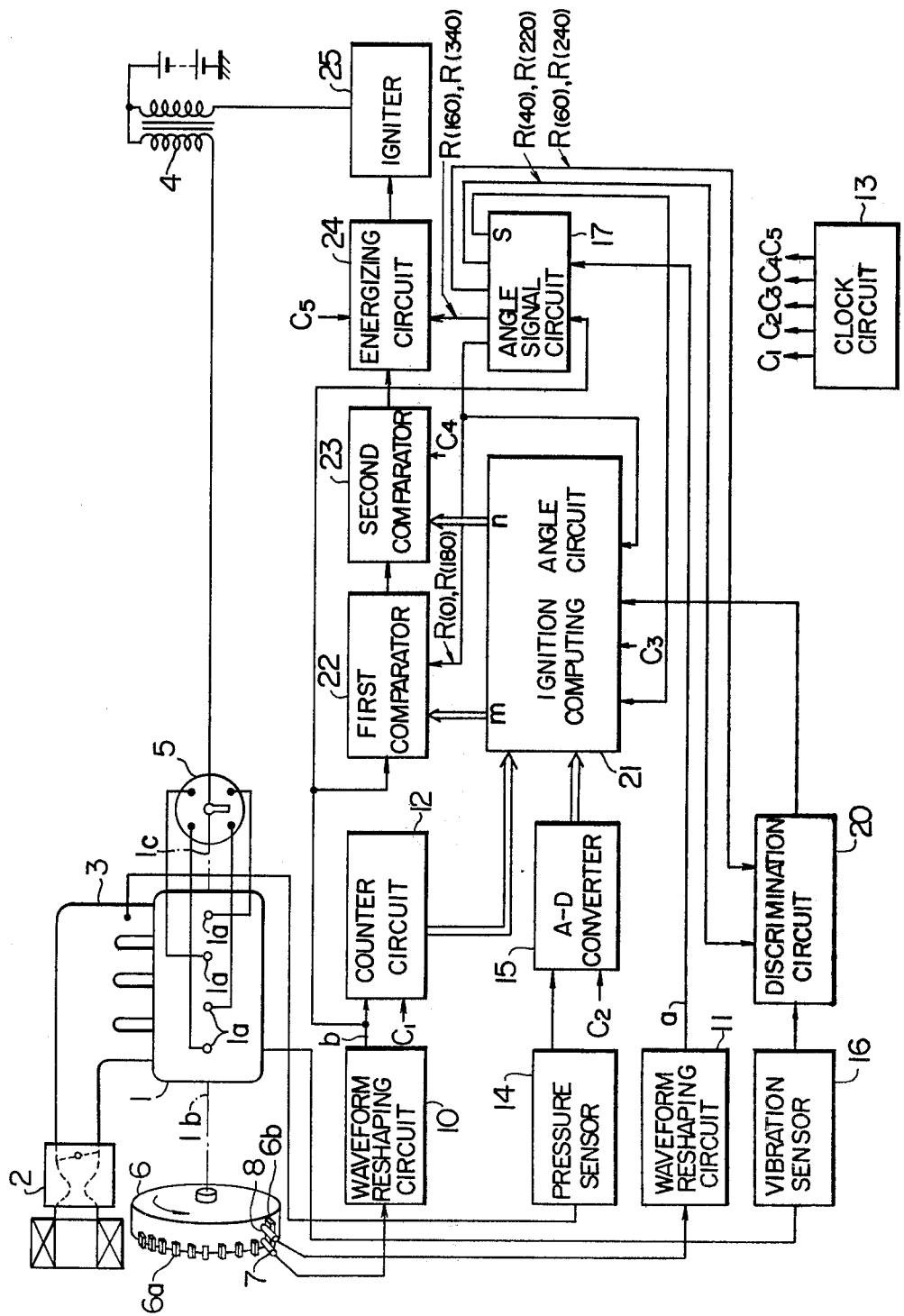
FIG. 1 is a block diagram showing an embodiment of an apparatus for performing the method of this invention.

Referring first to FIG. 1, an engine 1 is a known type of four-cylinder, four-cycle spark ignition engine in which an air-fuel mixture produced in a carburetor 2 is introduced through an intake manifold 3 during the downward movement of the pistons or the intake stroke, and during the upward movement of the pistons or the compression stroke a high voltage is sequentially applied to four spark plugs 1a through a distributor 5 driven by a cam shaft 1c to ignite the mixture.

A ring gear 6 is disposed for rotation in synchronism with a crankshaft 1b which is rotated by the reciprocating movement of the pistons of the engine 1, and a rotational angle sensor 7 and reference angle sensor 8 each comprising an electromagnetic pickup are positioned opposite to the ring gear 6. If the number of teeth 6a in the ring gear 6 is 115, the rotational angle sensor 7 generates a pulse signal having a frequency of 1,150 Hz at the engine speed of 600 rpm (=10 rps). The reference angle sensor 8 is disposed opposite to a reference position tooth 6b in the ring gear 6 which is provided at a position 60° before the top dead center of the first cylinder piston, and the sensor 8 generates a reference pulse signal at 60° before the top dead center position of the first cylinder piston.

Waveform reshaping circuits 10 and 11 are known type of circuit for respectively amplifying and converting into rectangular wave the output signals of the rotational angle sensor 7 and the reference angle sensor 8. A counter circuit 12 is adapted to measure the engine speed in response to the output pulses of the waveform reshaping circuit 10 and the clock pulses $C_1$ of a clock circuit 13, and its output indicative of the engine speed is generated in binary code form.

Although not shown in detail, the counter circuit 12 comprises a NAND gate adapted to be opened by the output pulse of the waveform reshaping circuit 10 to pass the clock pulses $C_1$ from the clock circuit 13, a counter for counting the clock pulses passed through the NAND gate, a latch circuit (temporary memory circuit) for temporarily storing the count value of the counter and generating the engine speed in binary code form and a signal generator responsive to the output pulses of the waveform reshaping circuit 10 to generate a reset signal for the counter and a storage command signal for the latch circuit.

The clock circuit 13 comprises a known type of square wave oscillator circuit, a frequency divider circuit for dividing the square wave from the oscillator circuit, a reshaping circuit for converting the output of the frequency divider circuit into pulses of a very small pulse width and a logic circuit, and it generates the clock pulses $C_1$ to $C_5$ constituting the reference timing signals for the respective blocks including the counter circuit 12.

A pressure sensor 14 is a known type of semi-conductor sensor adapted to detect the intake pressure in the intake manifold 3 of the engine 1 and generate its output in the form of analog voltage. The intake pressure in the intake manifold 3 corresponds to the load on the engine 1, so that with the speed of the engine 1 being constant, the intake pressure decreases with a decrease in the load and the intake pressure increases with an increase in the load. Thus, the pressure sensor 14 detects the load on the engine 1 and it constitutes a load sensor.

An A-D converter 15 is responsive to the clock pulses $C_2$ from the clock circuit 13 to convert the analog output voltage of the pressure sensor 14 into digital form and it includes a memory circuit.

Figure 2:
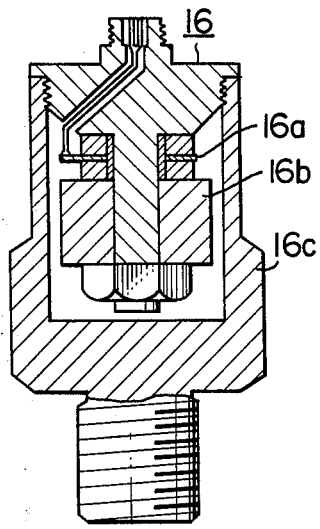
FIG. 2 is a sectional view of a vibration sensor.

A vibration sensor 16 is a piezoelectric sensor mounted on the cylinder block of the engine 1 and it employs a piezoelectric device to generate a voltage corresponding to the acceleration of vibrations caused in the cylinder block. The vibration sensor 16 has a construction such as shown in FIG. 2 in which a piezoelectric device 16a and a vibration responsive member 16b for deforming the piezoelectric device 16a in response to the vibration of the cylinder block are both housed in a case 16c, and the vibration sensor 16 is secured to the cylinder block by means of screwed connection or the like. The piezoelectric device of the vibration sensor 16 generates a high level output signal which increases with an increase in the intensity of the vibrations caused in the cylinder block.

An angle signal circuit 17 is responsive to the output signals of the waveform reshaping circuits 10 and 11 to generate angle signals R(0), R(180) and R(340) respectively at preset crank angle degrees of the piston in the first cylinder of the engine 1 and a data selection signal S.

In this specification, it is defined so that R(0) represents the position of that tooth 6a in the ring gear 6 corresponding to 60° before the top dead center of the first cylinder piston or an angle nearest to 60° on the top dead center side and that R(A) represents the angle of that tooth 6a which is equal to or smaller than but nearest to A degrees in terms of retard angle from R(0). Similarly, R(180) represents the angle of that tooth 6a which is equal to 180 degrees or before and nearest to 180 degrees in terms of retard angle from R(0). As a result, R(180) represents an angle which is an integral multiple of 3.13 (=360/115) corresponding to the angle of each tooth 6a.

A discrimination circuit 20 is responsive to the output signals of the vibration sensor 16 and the angle signal circuit 17 to discriminate whether the engine 1 is under the knocking condition and its output signal is applied to an ingition angle computing circuit 21.

The ignition angle computing circuit 21 comprises a plurality of IC's or a microcomputer and it receives the digital signal from the counter circuit 12 which is representative of the engine speed, the clock pulses $C_3$ from the clock circuit 13, the digital signal from the A-D converter 15 which is indicative of the intake pressure in the intake manifold 3 and the angle signals from the angle signal circuit 17. When it is discriminated that the load on the engine 1 is high in accordance with the engine speed and the intake pressure, the computing circuit 21 comes into operation so that if the engine 1 is not under the knocking condition, the proper spark advance angle is determined by adding in synchronism with the rotation of the engine an incremental advance angle $\Delta\theta$ to a current spark advance $\theta$, whereas if the engine is under the knocking condition the advance angle $2\Delta\theta$ is subtracted from the current spark advance $\theta$ in synchronism with the rotation of the engine, and in this way the spark advance is controlled in accordance with the knocking condition.

The computing circuit 21 is also designed so that when the load on the engine 1 is determined low in accordance with the engine speed and the intake pressure, the spark advance control according to the knocking condition is stopped and the spark advance is adjusted to the preset spark advance $\theta p$. When the computed spark advance exceeds $\theta max$ the spark advance is adjusted to $\theta max$, and when the computed spark advance becomes lower than the preset spark advance $\theta p$ the spark advance is adjusted to the $\theta p$.

The computing circuit 21 is further designed so that the spark advance in relation to the top dead center position of the pistons of the engine 1 is converted into a retard angle from another reference position in terms of crank angle degrees, so that this retard angle is divided by 3.13 degrees ($=360°/115$) corresponding to the angle of each tooth 6a in the ring gear 6 and the resulting quotient is generated in the form of first output value m and second output value n which are in turn respectively applied in binary code form to first and second comparators 22 and 23. In this case, if the retard angle is 40° for example, we obtain $40° = 12 \times 3.13° + 0.77 \ldots °$. Thus, the first output value m represents 01100 which is the binary code corresponding to 12 and the second output value n represents the remaining angle $0.77 \ldots °$ which was divided by the engine speed, converted into a time and represented in binary code form.

The comparators 22 and 23 compare the computed value of the ignition timing computing circuit 21 with the actual crank angle of the engine 1 and respectively generate an output signal when the two values are equal digitally. Thus, the first comparator 22 is reset by the reference angle signal R(0) or R(180) to start the comparison operation, and the first comparator 22 generates an output signal and resets the second comparator 23 when the number of output pulses from the waveform reshaping circuit 10 coincides with the first output value of the output of the ignition angle computing circuit 21 or data m of 5 bits long, for example. When this occurs, the second comparator 23 immediately initiates the comparison operation so that when the second output value or data m of 10 bits long, for example, of the output of the ignition angle computing circuit 21 becomes equal to the number of clock pulses $C_4$ from the clock circuit 13, an output signal is generated. This output signal is used as an ignition timing signal.

An energizing circuit 24 is a circuit which is responsive to the output signal of the second comparator 23 and the angle signal R(160) or R(340) from the angle signal circuit 17 to determine the length of time during which current is supplied to an ignition coil 4 and effect the ignition, and an igniter 25 is a known type of ignition circuit which subjects the output signal of the energizing circuit 24 to power amplification to energize the ignition coil 4.

Next, the circuit construction of the blocks constituting the principal parts of the apparatus for performing the method of this invention will now be described in detail.

Figure 3:
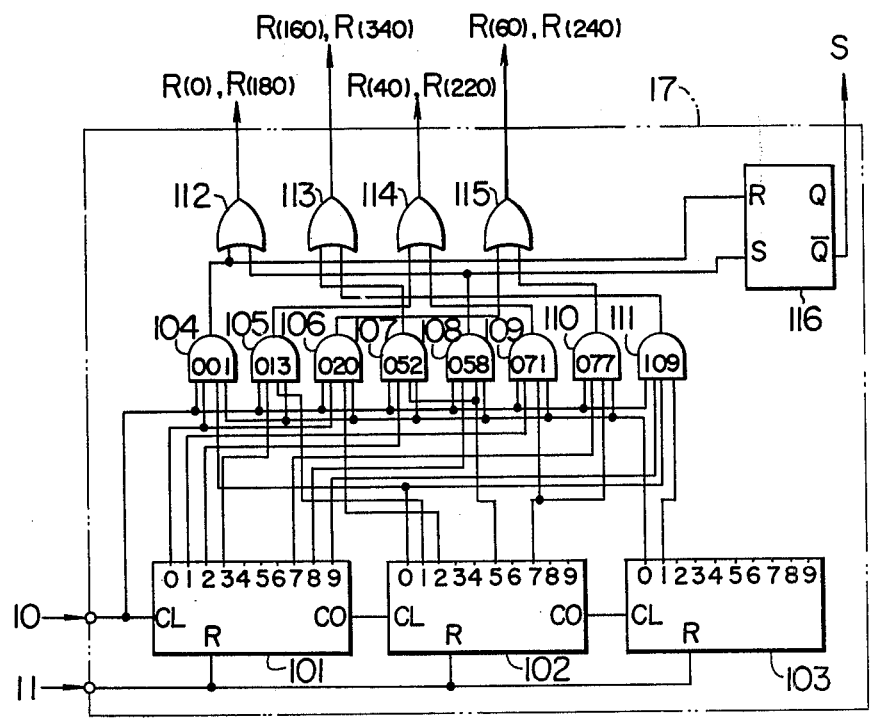
FIG. 3 is a circuit diagram of an angle signal circuit.

Referring to FIG. 3, the angle signal circuit 17 comprises divider/decade counter 101, 102 and 103, 4-input AND gates 104, 105, 106, 107, 108, 109, 110 and 111, OR gates 112, 113, 114 and 115 and an R-S flip-flop 116.

Figure 7:
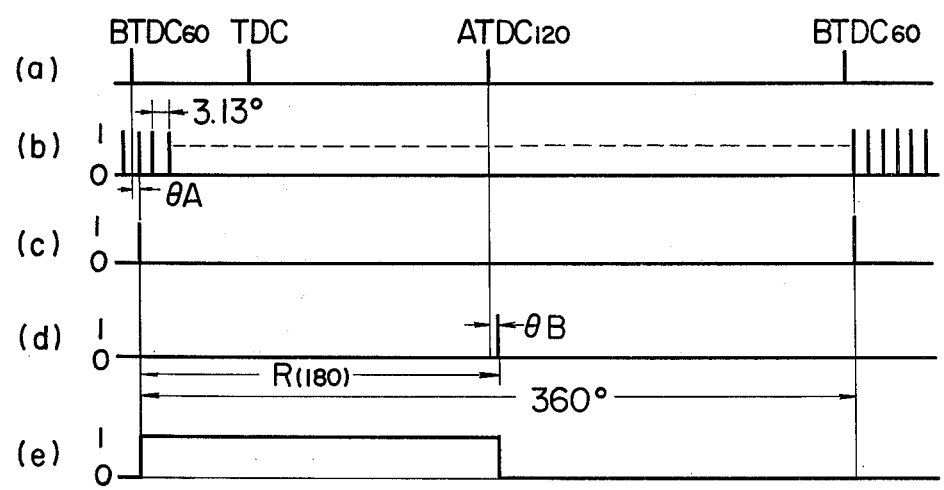
FIG. 7 is a waveform diagram useful for explaining the operation of the invention.

The counter 101 receives at its clock terminal CL the output pulses of the waveform reshaping circuit 10 shown in (b) of FIG. 7 and at its reset terminal R the output pulse of the waveform reshaping circuit 11. The counter 102 receives at its clock terminal CL the carry-out (CO) output of the counter 101 and at its reset terminal R the output pulse of the waveform reshaping circuit 11. The counter 103 receives at its clock terminal the carry-out (CO) output of the counter 102 and at its reset terminal R the output pulse of the waveform reshaping circuit 11.

Since each of these counters generates a pulse from its carry-out terminal CO for every 10 pulses counted, and consequently the counters 101, 102 and 103 operate together as decade counters representing 0 to 999.

The AND gate 104 is a gate for generating a signal R(0) and it is connected to the clock terminal CL and the output terminal (1) of the counter 101 and the output terminal (0) of the counters 102 and 103, respectively, thus generating the angle signal R(0) shown in (c) of FIG. 7 in response to the counting of one pulse.

Similarly, the AND gates 105, 106, 107, 108, 109, 110 and 111 respectively generate angle signals R(40), R(60), R(160), R(180), R(220), R(240) and R(340) in response to 13, 20, 52, 58, 71, 77 and 109 pulses received from the waveform reshaping circuit 10.

The OR gate 112 performs the OR operation on the signals R(0) and R(180) and generates a superimposed angle signal R(0)·R(180). Similarly, the OR gate 113 performs the OR operation on the signals R(160) and R(340), the OR gate 115 performs the OR operation on the signals R(40) and R(220) and the OR gate 115 performs the OR operation on the signals R(60) and R(240), thus respectively generating an angle signal composed of the two signals superposed.

The R-S flip-flop 116 receives the signal R(0) at its reset terminal R and the signal R(180) at its set terminal S and generates the data selection signal S shown in (e) of FIG. 7.

The signals R(0) to R(340) correspond to the teeth 6a of the ring gear 6, that is, the signal R(0) corresponds to the 1st tooth after the arrival of the reference angle signal, and in the like manner the signal R(40) corresponds to the 13th tooth, the signal R(60) to the 20th tooth, the signal R(160) to the 52nd tooth, the signal R(180) to the 58th tooth, the signal R(220) to the 71st tooth, the R(240) to the 77th tooth and the signal R(340) to the 109th tooth.

Figure 4:
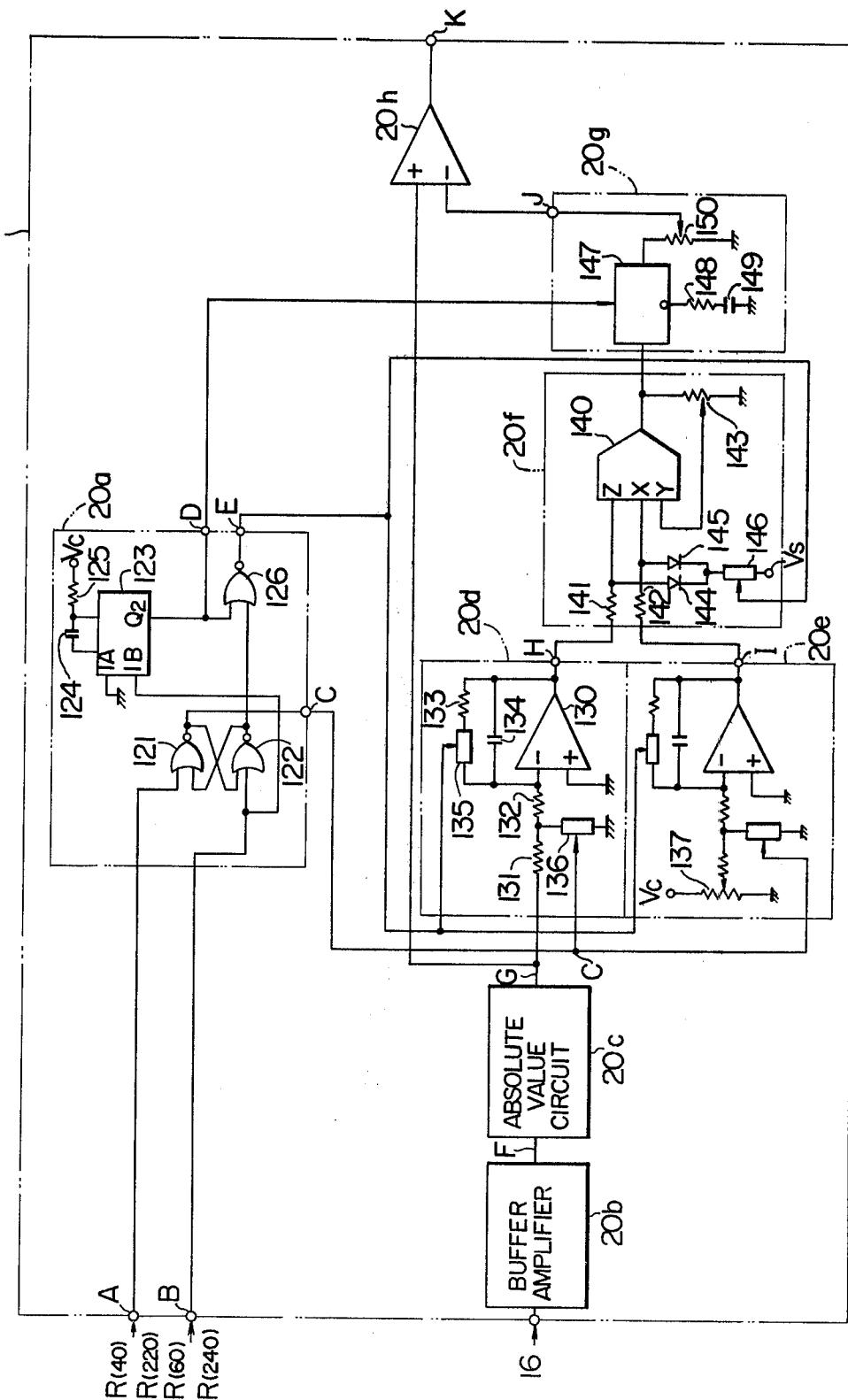
FIG. 4 is a circuit diagram showing a discrimination circuit.
Figure 5:
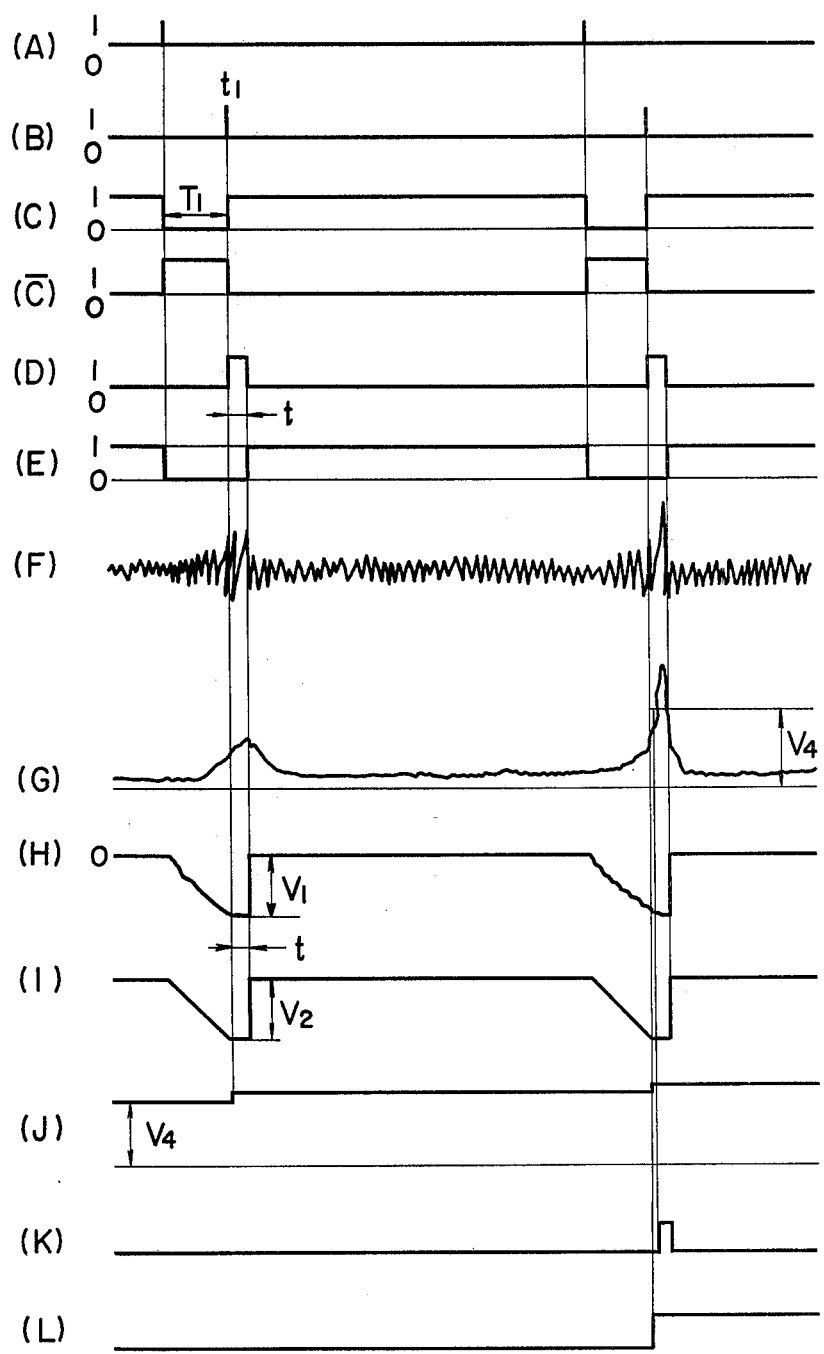
FIG. 5 is a waveform diagram useful for explaining the operation of the circuit of FIG. 4.

The discrimination circuit 20 will now be described with reference to FIGS. 4 and 5. FIG. 4 shows its circuit diagram and FIG. 5 is a waveform diagram useful for explaining its operation. In FIG. 4, a control pulse generating circuit 20a comprises an R-S flip-flop and a monostable multivibrator. The R-S flip-flop comprises NOR gates 121 and 122, and the NOR gate 121 receives from the angle signal circuit 17 the signals R(40) and R(220) shown in (A) of FIG. 5 and each indicating that the piston of the cylinder has arrived approximately at the position of 20° before the top dead center. The other NOR gate 122 receives the signals R(40) and R(220) shown in (B) of FIG. 5 and each indicating that the piston of the cylinder has arrived approximately at the top dead center (TDC).

The output of the NOR gate 121 has the waveform shown in (C) of FIG. 5, and the output of the NOR gate 122 has the waveform shown in ($\overline{C}$) of FIG. 5.

The monostable multivibrator comprises a mono-stable multivibrator IC 123 (The Texas Instruments SN 74123) and externally connected capacitor 124 and resistor 125, and it generates the pulse signal shown in (D) of FIG. 5 and having a pulse width of about 100 μsec in response to the signal R(60) or R(240) applied to its input terminal 1B.

A NOR gate 126 performs the NOR operation on the output signals of the NOR gate 122 and the monostable multivibrator and generates the signal shown in (E) of FIG. 5.

A buffer amplifier 20b is an impedance converter which converts the output signal of the vibration sensor 16 into a low impedance signal amplifies it. An absolute value circuit 20c is a known type of full-wave rectifier circuit which produces the absolute value of positive and negative signals and it functions to invert the negative half cycle of the vibration wave signal applied from the vibration sensor 16 by way of the buffer amplifier 20b. Assuming now that the output signal of the buffer amplifier 20b has the waveform shown in (F) of FIG. 5, the output signal of the absolute value circuit 20c has the waveform shown in (G) of FIG. 5.

A first integrator 20d integrates the waveform shown in (G) of FIG. 5 over the time interval during which the cylinder piston moves from 20° before the top dead center to the top dead center, that is, over the time interval during which the crankshaft 1b rotates through an angle of 20°, and it comprises an OP amplifier 130, resistors 131, 132 and 133, a capacitor 134 and analog switches 135 and 136. The analog switch 135 is turned on and off in response to the signal generated from the control pulse generating circuit 20a and shown in (E) of FIG. 5, and the analog switch 136 is turned on and off in response to the signal shown in (C) of FIG. 5.

When the signal C shown in (C) of FIG. 5 goes to "1" the analog switch 136 is turned on, and the analog switch 135 is turned on when the signal (E) shown in (E) of FIG. 5 goes to "1", thus causing the output of the first integrator 20d to become 0 V. When both the signals C and E go to "0", both the analog switches 135 and 136 are turned off and consequently the first integrator 20d starts integrating in a negative direction. While the duration of integration continues until the analog switch 135 is again turned on, the output signal of the absolute value circuit 20c, is applied only during the off period of the analog switch 136 and thus the duration of integration continues until the cylinder piston reaches the top dead center.

The "1" period t of the signal D shown in (D) of FIG. 5 is the holding time of the integrator 20d and its output remains unchanged. The resulting output signal waveform of the first integrator 20d becomes as shown in (H) of FIG. 5 and its output voltage $V_1$ is given by $$-\int_O^{T_1} G \, dt,$$

where $T_1$ represents the time interval during which the signal C is at "0" and G represents the vibration waveform.

A second integrator 20e is substantially the same as the first integrator 20d in circuit construction except that a predetermined voltage is applied from a voltage divider 137 as an input for integration in place of the vibration waveform. The resulting output signal waveform of the second integrator 20e becomes as shown in (I) of FIG. 5, and if VR represents the output voltage of the voltage divider 137 its output voltage $V_2$ is given by $$-\int_O^{T_1} VR \, dt$$

and proportional to the time $T_1$.

A divider 20f divides the output voltage $V_1$ of the first integrator 20d by the output voltage $V_2$ of the second integrator 20e, and it comprises a multiplier 140 (the Intersil 8013) which is capable of performing the operation of division, resistors 141 and 142, a voltage divider 143, diodes 144 and 145 and an analog switch 146. The analog switch 146 is turned on and off in response to the signal E shown in (E) of FIG. 5 and also a negative supply voltage $V_S$ is applied to it.

When the signal E goes to "1", the analog switch 146 is turned on and the negative supply voltage $V_S$ is applied to the input terminals X and Z of the multiplier 140. When the signal E goes to "0", the output voltage $V_1$ of the first integrator 20d is applied to the input terminal Z and the output voltage $V_2$ of the second integrator 20e is applied to the input terminal X. By adjusting the voltage divider 143, the multiplier 140 performs the multiplication 10Z/X and its output $V_3$ is given by $$V_3 = 10 \times (-\int_O^{T_1} G \, dt) \div (-\int_O^{T_1} VR \, dt)$$
$$= \frac{K_1 \int_O^{T_1} G \, dt}{T_1}$$

wherein $K_1$ is a proportionality constant (=10/VR).

A sample-and-hold circuit 20g comprises a sample-and-hold IC 147 (the Intersil 1H 5110), a resistor 148, a capacitor 149 and a voltage divider 150, and it is responsive to the signal D shown in (D) of FIG. 5 to sample and hold the output signal of the divider 20f and generate the signal shown in (J) of FIG. 5. In this case, the output voltage of the IC 147 is the same with the output voltage voltage $V_3$ of the divider 140 and the voltage $V_3$ is divided by the voltage divider 150 to generate a voltage $V_4$. As a result, the output voltage $V_4$ is given by the following equation $$V_4 = \frac{K_1 \cdot K_2 \int_O^{T_1} G \, dt}{T_1} = \frac{K \int_O^{T_1} G \, dt}{T_1}$$

wherein $K_2$ is the division ratio of the voltage divider 150 and $K = K_1 \cdot K_2$. As will be seen from the above equation, the output voltage $V_4$ represents the average value per unit time of the magnitude of the vibration during the time that the cylinder piston of the engine 1 moves from 20° before the top dead center to the top center or the crankshaft 1b rotates through the predetermined angle.

A comparator 20h receives the output signals of the absolute value circuit 20c and the sample-and-hold circuit 20g, that is, the instantaneous value of the magnitude of the vibration detected by the vibration sensor 16 is compared with a value proportional to the average value of the magnitude of the vibration over the time interval between 20° before the top dead center and the top dead center and it generates a "1" signal when the instantaneous value exceeds a predetermined multiple of the average value.

Knocking occurs in the engine 1 after each cylinder piston has passed the top dead center and the knocking causes the instantaneous value of the magnitude of the vibration to become greater than the average value. As a result, when knocking occurs, the comparator 20h generates a pulse signal as shown in (K) of FIG. 5.

When it is desired to increase the width of the output pulse signal of the comparator 20h, this may be accomplished by adding an R-S flip-flop in such a manner that the signal B shown in (B) of FIG. 5 is applied to its reset input and the output signal of the comparator 20h is applied to its set input, thus generating an output signal as shown in (L) of FIG. 5.

It will thus be seen that the presence of knocking in the engine 1 can be discriminated in accordance with the output signal of the comparator 20h or the output signal of the discrimination circuit 20.

The power circuit and the power sources $V_C$ and $V_S$ for the respective component parts are of the known type and they are not shown.

Next, the ignition angle computing circuit 21 will be described. The ignition angle computing circuit 21 is composed of a commercially available microcomputer (the Toshiba TLCS-12). The construction and operation of the microcomputer will not be described and only the controlling computational operations will be described hereunder.

Figure 6:
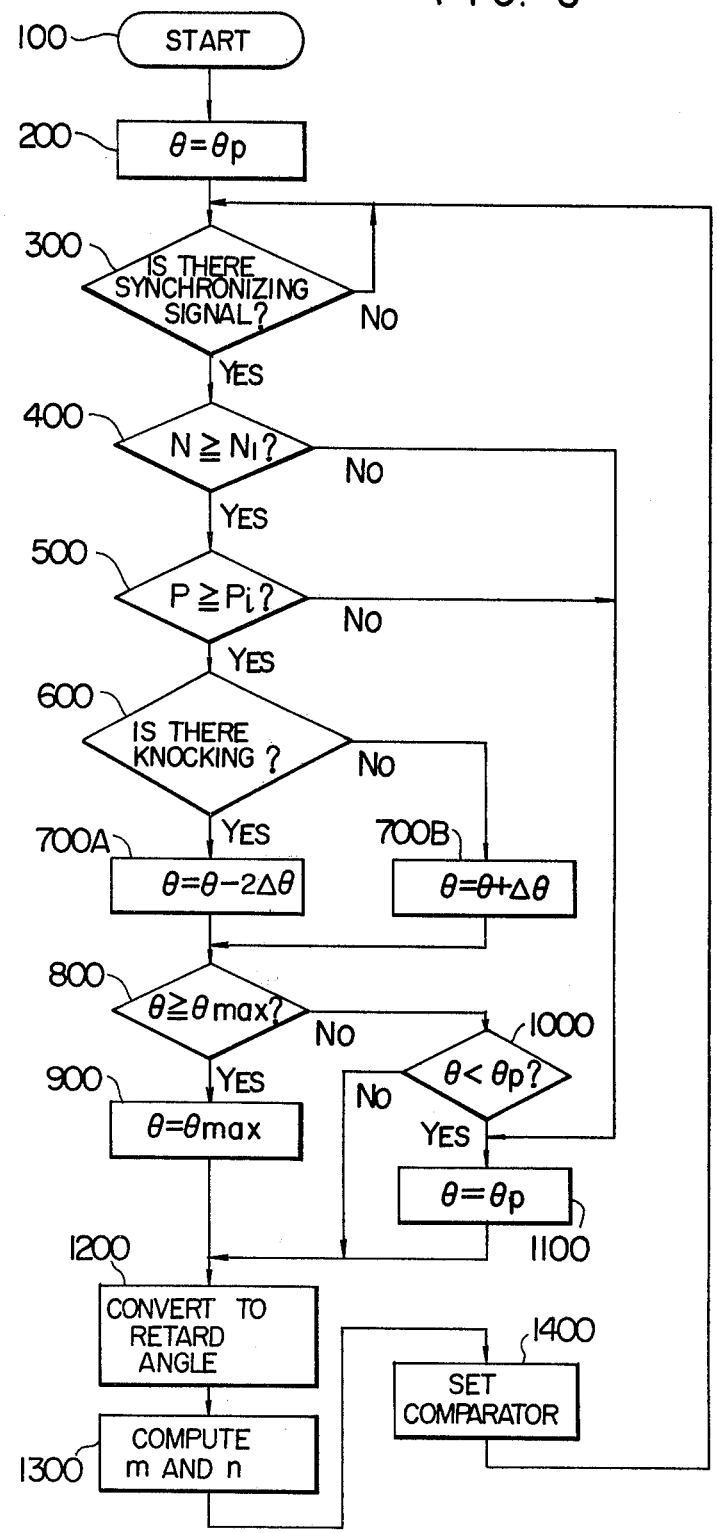
FIG. 6 is a flow chart useful for explaining the operation of the invention.

Referring to FIG. 6 illustrating a flow chart of the microcomputer, when a switch (not shown) for energizing an electric load in an automobile is turned on to connect the load to a power source, the computation is started at a start step 100. A second step 200 sets the spark advance $\theta$ at the preset spark advance $\theta p$ which has been preliminarily programmed into the memory of the computer. In this case, the spark advance $\theta p$ represents the sum of a spark advance determined in accordance with the engine speed and another spark advance determined in accordance with the engine intake pressure and it has been preset to correspond with the MBT characteristic.

A third step 300 discriminates whether the signal R(0) or R(180) generated in synchronism with the crankshaft $1b$ of the engine 1 for every half crankshaft revolution is at "1".

A fourth step 400 discriminates whether the current engine speed N is higher than a preset speed $N_1$ (e.g., 800 rpm). When this is not the case, it is determined that the engine 1 is idling and the spark advance $\theta$ is adjusted to that value $\theta p$ which is correct for the idling. When this is the case, the computation proceeds to a fifth step 500.

The fifth step 500 determines whether the intake pressure P of the engine 1 is higher than a predetermined pressure $P_1$ (e.g., a pressure value of about 520 to 600 mmHg or $-120$ to $-200$ mmHg in terms of negative pressure) to thereby discriminate whether the load on the engine 1 is high. When this is not the case, the spark advance $\theta$ is set at the programmed spark advance $\theta p$. When this is the case, the computation proceeds to a sixth step 600.

The sixth step 600 determines whether the engine 1 is knocking in accordance with the output signal of the discrimination circuit 20. When this is not the case, the proper advance $\theta$ is obtained by adding the desired small spark advance $\Delta\theta$ to the spark advance $\theta$ by a seventh step 700B and the computation proceeds to an eighth step 800. When this is the case, the proper advance $\theta$ is obtained by subtracting the desired small spark advance $2\Delta\theta$ from the spark advance $\theta$ by the other seventh step 700A and the computation proceeds to the eighth step 800.

The eighth step 800 determines whether the computed spark advance $\theta$ is greater than the maximum spark advance $\theta$max. When this is the case, the computation proceeds to a ninth step 900 by which the computed spark advance $\theta$ is set at the maximum spark advance $\theta$max and the computation proceeds to a twelfth step 1200. When this is not the case, the computation proceeds to a tenth step 1000 which in turn determines whether the computed spark advance $\theta$ is smaller than the programmed spark advance $\theta p$. When this is the case, the computation proceeds to an eleventh step 1100 which in turn sets the computed spark advance $\theta$ at the programmed spark advance $\theta p$, and the computation proceeds to the twelfth step 1200. When this is not the case, the computation proceeds directly to the twelfth step 1200.

The twelfth step 1200 performs the computation (60-spark advance $\theta$) to convert the spark advance computed in relation to the top dead center of each cylinder to a retard angle $\theta'$ with respect to another point which is 60° before the top dead center in this embodiment.

A thirteenth step 1300 obtains first and second output values m and n from the retard angle $\theta'$. In this operation, firstly, a correction is made by subtracting a correction factor $\theta A$ or $\theta B$ from the retard angle $\theta'$. The correction factor $\theta A$ and $\theta B$ are necessary due to the fact that actually there exists a difference between the point of 60° before the top dead center and the position of the corresponding tooth $6a$ in the ring gear 6 and that there are errors in the relative mounting positions of the rotational angle sensor 7 and the reference angle sensor 8. Correction must be made for these two reasons. However, these two corrections are fixed quantities. As a result, the mounting errors of the sensors 7 and 8 and the difference between the point of 60° before TDC and the position of the corresponding tooth $6a$ of the ring tear 6 are considered as a whole as shown in FIG. 7. In the Figure, (a) shows the actual top dead center (TDC) and 60 degrees before the top dead center (BTDC 60),
(b) the output signal of the waveform reshaping circuit 10, (c) the signal R(0), (d) the signal R(180), and (e) the data selection signal S.

As will be seen from (a) and (b) of FIG. 7, there is a difference between the pulse from the waveform reshaping circuit 10 and the actual position of BTDC 60 and this deviation or difference angle is represented by $\theta A$. Of course, the value of $\theta A$ is smaller than 3.13°. In other words, although not shown, strictly a reference angle signal occurs as a matter of fact at a position deviated from the position of the BTDC 60, and consequently the reference rotational position in terms of the output waveform of the waveform reshaping circuit 10 is in fact inaccurate. As a result, by using as a reference the position R(0) of that tooth $6a$ of the ring gear 6 which is after but closest to the position of the BTDC 60, it is possible to ensure more liberal mounting accuracy for the reference angle sensor 8 and greater reliability. The difference angle between the R(0) and BTDC 60 positions corresponds to $\theta A$. Thus, since the first comparator 22 uses the R(0) position as a reference in performing comparison, correction must be made for this quantity.

Similarly, assuming that the reference position for determining the timing of spark ignition in the third and second cylinders is set at 180 degrees after the position of BTDC 60 or a position which is 120 degrees after TDC or the ATDC 120 position and that the R(180) position corresponds to that tooth of the ring gear which is after but closest to the ATDC 120 position, there of course exists a difference between the ATDC 120 and R(180) positions. If this difference is represented by $\theta B$, the output of the subtractor representing a total retard angle must be corrected for the quantity of $\theta B$. As a result, it is necessary to make correction for the value $\theta A$ in determining the timing of spark ignition in that first and fourth cylinders in which the pistons move in the same direction. Similarly, it is necessary to make correction for the value $\theta B$ in determining the timing of spark ignition in the third and second cylinders in which the pistons move in the same direction. The corrections $\theta A$ and $\theta B$ have been preliminarily programmed into the ROM (memory circuit) in the ignition angle computing circuit 21, and one or the other of these values is subtracted in response to the data selection signal S from the angle signal circuit 17. Namely, the value $\theta A$ is subtracted when the signal S is at "1" and the value $\theta B$ is subtracted when the signal S is at "0". Let it be assumed that M represents the value obtained by correcting the retard angle $\theta'$ for the value $\theta A$ or $\theta B$, and the value M is divided by 3.13 to represent it by a quotient m and a residual m', as follows $$M = 3.13 \times m + m'$$

The quotient m is the first output value and the residual m' is an angle smaller than 3.13.

Thereafter, the angle m' is divided by the output of the counter circuit 12 or the engine speed N (rps) and then converted into a time n as follows $$n = P \cdot m'/N \text{ (where P is a suitable constant)}$$

In this case, 1/N is proportional to the time required for one revolution or 360 degrees of rotation of the ring gear 6, and the time n required for rotating through the angle m' is given by the following equation $360°:m' = K/N:n$ (where K is a suitable constant)

and therefore we obtain $n = m'/360 \cdot K/N$

The time n is the second output value.

A fourteenth step 1400 sets in a binary code form the values m and n computed by the step 1300 in the first and second comparators 22 and 23. When the fourteenth step 1400 has been completed, the computation returns to the third step 300 and the same process is repeated.

As will be seen from the foregoing instruction words are programmed in the microcomputer ROM.

Figure 8:
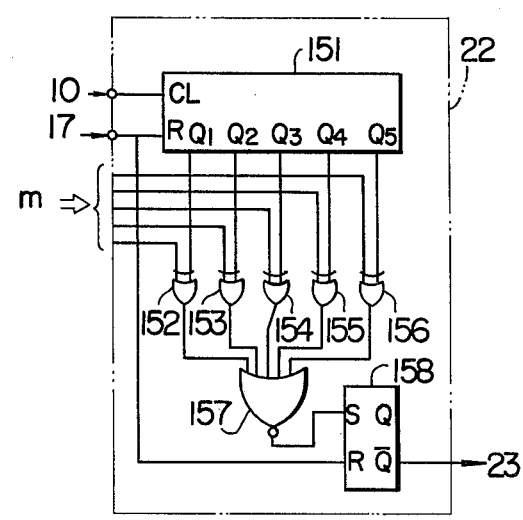
FIG. 8 is a circuit diagram showing a first comparator.

Referring now to FIG. 8, there is illustrated an exemplary detailed circuit diagram of the first comparator 22. In the Figure, the first comparator 22 comprises a binary counter 151, EXCLUSIVE OR gates 152 to 156, a NOR gate 157 and an R-S flip-flop 158. As a result, when the binary counter 151 and the R-S flip-flop 158 are reset by the reset signal R(0) or R(180) from the angle signal circuit 17, the binary counter 151 starts counting the pulse signals applied from the waveform reshaping circuit 10. Each pulse signal corresponds to 3.13° in terms of crank angle degrees. When the count value of the binary counter 151 attains the binary output or the first output value m in the output of the ignition angle computing circuit 21, all the outputs of the EXCLUSIVE OR gates 152 to 156 go to "0" so that the output of the NOR gate 157 goes to "1" and the R-S flip-flop 158 is set. The degrees of rotation from the time that the R-S flip-flop 158 is reset until it is set, that is, the degrees of rotation in which a "1" is generated at the $\bar{Q}$ output terminal of the R-S flip-flop 158 is proportional to binary code output or the first output value m of the ignition angle computing circuit 21. What is important here is the fact that the time at which the output signal at the Q output terminal of the R-S flip-flop 158 goes from "1" to "0" corresponds to the retard angle or the first output value m of the ignition angle computing circuit 21. Since the input clock pulses to the first comparator 22 are the output of the waveform reshaping circuit 10 and hence they represent a crank angle itself, if any change occurs in the crankshaft speed in the course of the counting, it will be reflected as such in the counting. The second comparator 23 is identical in construction with the first comparator 22 except that the number of bits in the counter, the number of the EXCLUSIVE OR gates and the number of the inputs of the NOR gate are different depending on the number of the input bits. In this embodiment, a 10-bit counter, ten EXCLUSIVE OR gates and 10-input NOR gate are used. The input clock pulses consist of the output signals or clock pulses $C_4$ of the clock circuit 13 and the clock pulses $C_4$ have a fixed frequency of 500 KHz. The output signal of the first comparator 22 is applied as a reset signal for the counter and the R-S flip-flop. Also applied as its input data is the 10-bit output value n of the ignition angle computing circuit 21. Thus, when the output signal of the first comparator 22 goes from "1" to "0", second comparator 23 starts counting and its output goes from "1" to "0" when the number of the clock pulses $C_4$ attains the second output value n representing the output value m' of the ignition angle computing circuit 21 which was converted into a retardation time corresponding to the then current engine speed. As a result, this time of transition from "1" to "0" corresponds to the retard angle $\theta'$ of the ignition angle computing circuit 21 at the current engine speed, and the time at which the output of the second comparator 23 goes from "1" to "0" is the proper timing of spark ignition.

Figure 9:
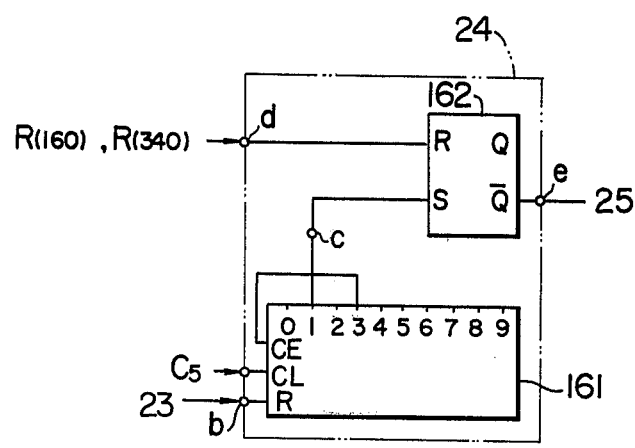
FIG. 9 is a circuit diagram showing an energizing circuit.

The energizing circuit 24 will now be described with reference to FIG. 9. The energizing circuit 24 comprises a divider/counter 161 and an R-S flip-flop 162. The counter 161 receives the clock pulses $C_5$ (1 MHz) from the clock circuit 13 at its clock terminal Cl and the output of the second comparator 23 at its reset terminal R. The output terminal (3) of the counter 161 is connected to its clock enable terminal CE to inhibit the counting of the clock pulses in excess of three.

Figure 10:
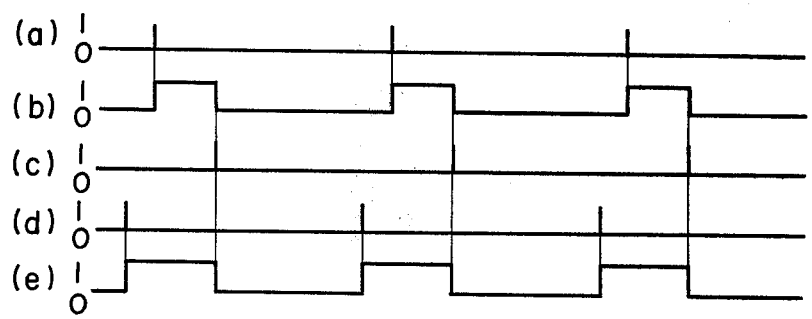
FIG. 10 is a waveform diagram useful for explaining the operation of the circuit of FIG. 9.

When the R-S flip-flop 162 is reset by the signal R(60) or R(340) shown in (d) in FIG. 10, its output Q goes from "0" to "1" as shown in (e) of FIG. 10. Thereafter, in response to the signal R(0) or R(180) shown in (a) of FIG. 10 the second comparator 23 generates the signal shown in (b) of FIG. 10 and the output signal of the second comparator 23 resets the counter 161. When the reset signal goes from "1" to "0", the counter 161 starts counting the clock pulses $C_5$ so that when one clock pulse is counted, the signal shown in (c) of FIG. 10 is generated from its output terminal (1) and the R-S flip-flop 162 is set thus causing its output $\bar{Q}$ to go from "1" to "0".

Consequently, the output signal of the R-S flip-flop 162 has the waveform shown in (e) of FIG. 10, and after power amplification by the igniter 25 the signal is used to energize the ignition coil 4. In this case, current is supplied to the primary winding of the ignition coil 4 so long as the output signal of the R-S flip-flop 162 remains at "1", and the current supply is interrupted so long as the signal is at "0". When the current supply is interrupted, a high voltage is induced in the secondary winding of the ignition coil 4 and the high voltage is distributed and applied through the distribution 5 to the spark plugs 1a of the cylinders in the compression stroke to cause a spark thereat.

With the construction described above, when it is found that the intake pressure in the intake manifold 3 of the operating engine 1 is low and the load on the engine 1 is low or partially loaded, the ignition angle computing circuit 21 sets the spark timing at the MBT or the preliminarily programmed spark advance, thus allowing the engine 1 to produce a full torque.

When it is determined that the intake pressure is in excess of the predetermined value and the load on the engine 1 is high or full load, if the spark timing of the engine 1 is the MBT, the engine 1 will be caused to knock. When knocking occurs in the engine 1, the vibration of the engine 1 changes with the resulting increase in the instantaneous value of the vibration waveform detected by the vibration sensor 16 and this instantaneous value exceeds the average value of the vibration over the time interval between approximately 20 degrees before the top dead center and the top dead center of the cylinder piston.

Consequently, the discrimination circuit 20 applies a knocking signal to the ignition angle computing circuit 21 which in turn decreases the spark advance by subtracting the step spark advance $2\Delta\theta$ (e.g. about 2°) from the preset spark advance $\theta p$ in synchronism with the engine rotation, and in this way the spark advance is decreased to retard the spark timing and thereby to prevent the knocking of the engine 1. When the engine 1 stops knocking, the spark timing is advanced by the ignition angle computing circuit 21 which increases the spark advance by adding the small spark advance $\Delta\theta$ (e.g., about 1°) to the current spark advance in synchronism with the engine rotation. Thereafter, the process is repeated and consequently the spark timing of the engine 1 is feedback controlled to the proper timing which prevents knocking and is close to the MBT, that is, the threshold timing for the occurrence of knocking, and the engine 1 operates with a sufficient torque. In this way, after the knocking in the engine 1 has been detected, the occurrence of knocking by the next combustion is positively prevented by virtue of the fact that the angle $2\Delta\theta$ by which the ignition timing is retarded is greater than the angle $\Delta\theta$ by which the ignition timing is advanced next.

Figure 13:
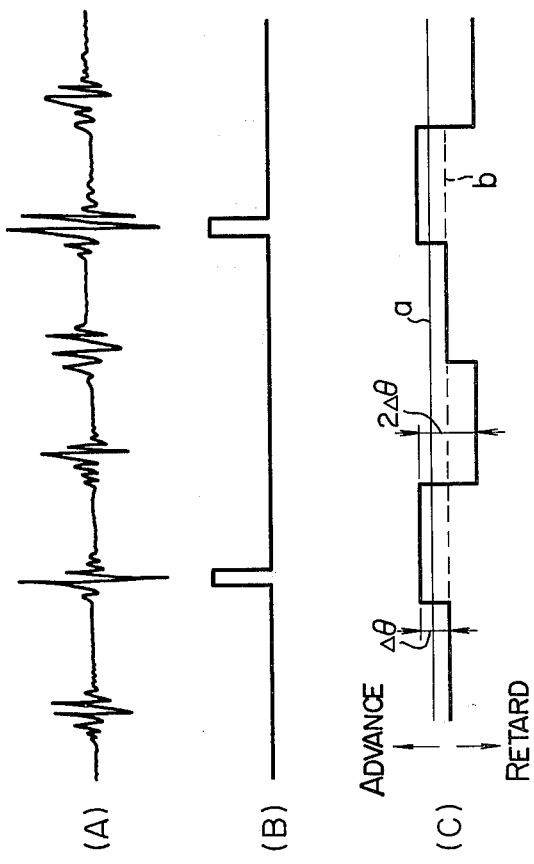
FIG. 13 is a waveform diagram showing output characteristics of a discrimination circuit and ignition angle computing circuit.

FIG. 13 shows this operating characteristic diagram. In the Figure, shown in (A) is the output signal of the buffer amplifier 20b, shown in (B) is the knocking discrimination output of the comparator 20h and shown in (C) is the output ignition timing characteristic of the ignition angle computing circuit 21. The solid line a indicates the knocking spark advance and the dotted line b indicates the average spark advance.

While, in the embodiment described above, the advancing angle is selected $\Delta\theta$ and the retarding angle is selected $2\Delta\theta$, in view of the object of this embodiment it is of course possible to select the retarding angle as $3\Delta\theta$, $4\Delta\theta$ or the like.

With the ignition angle computing circuit 21, the spark timing is controlled between the maximum spark advance $\theta$max and the minimum spark advance $\theta$p and there is no possibility of the spark advance being adjusted to any value outside the range between $\theta$max and $\theta$p, thus preventing the engine 1 from stalling or operating in the reverse direction.

Figure 11:
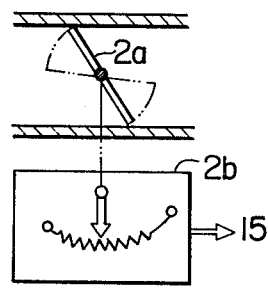
FIG. 11 is a diagram showing the principal part of another embodiment of the apparatus.

While, in the embodiment described above, the intake pressure sensor is used to detect the load on th engine 1, it is possible to use a throttle sensor shown in FIG. 11. In the Figure, the opening of a throttle valve 2a for regulating the intake air quantity, is converted into an electric signal by a throttle sensor 2b which may for example be a potentiometer and the signal is applied to the A-D converter 15. When the opening of the throttle valve 2a is greater than a predetermined value, the ignition angle computing circuit 21 determines that the engine 1 is under high load operation.

Figure 12:
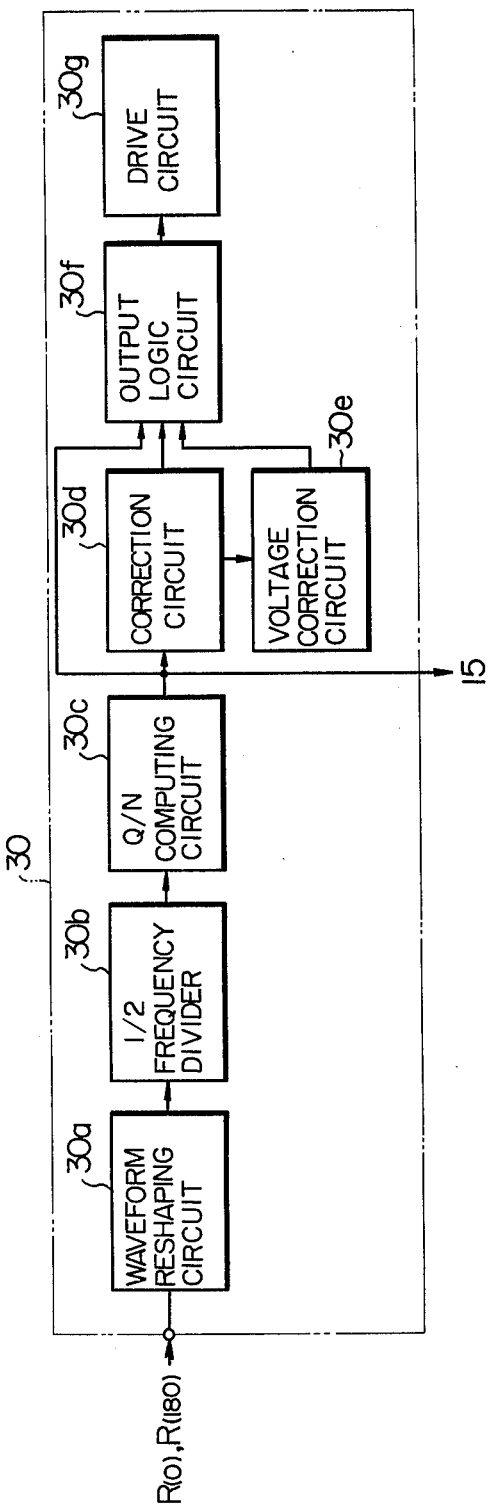
FIG. 12 is a block diagram showing the principal parts of still another embodiment of the apparatus.

In case the engine 1 is equipped with an electronically controlled fuel injection system, the load on the engine 1 can be discriminated in accordance with an injection pulse signal which controls the duration of opening of the electromagnetic fuel injectors. Referring to FIG. 12 showing an electronic control circuit 30 for the fuel injection system, the control circuit 30 comprises a wave-form reshaping circuit 30a for changing the waveform of signals R(0) and R(180), a ½ frequency divider for dividing the output signal of the circuit 30a by a factor of 2 to generate a signal corresponding to the engine speed N, a Q/N computing circuit 30c for obtaining Q/N from the output signal N of the circuit 30b and the intake air quantity signal Q from an air flow sensor which is not shown and adapted to detect the amount of air flow to the engine 1 and generating an injection pulse signal $\tau$, a correction circuit 30d for correcting the pulse signal $\tau$ for variations in the engine cooling water temperature, battery voltage, etc., voltage correction circuit 30e, an output logic circuit 30f for performing the OR operation on the output signals of the circuits 30c, 30d and 30e, and a drive circuit 30g responsive to the output signal of the circuit 30f to operate the electromagnetic fuel injectors.

The pulse width of the injection pulse $\tau$ or the output signal of the Q/N computing circuit 30c corresponds to the load on the engine 1, and the load on the engine 1 is determined high when the pulse width exceeds a predetermined value (e.g., 5 to 6 msec).

In the embodiments described above, the average value of the magnitude of engine vibration may be obtained from the vibrations caused during the rotation of the crankshaft from the piston position corresponding to the spark timing of the engine to the top dead center position of the piston. Either one or both of the average and instantaneous values of the magnitude of the vibration which are necessary for detecting the presence of knocking in the engine may be obtained without applying the output of the vibration sensor to the absolute value circuit.

We claim:

1. A method for controlling a timing of spark ignition for an internal combustion engine having an output shaft rotated by a piston, the method comprising the steps of:

monitoring a magnitude of vibration of said internal combusion engine by vibration responsive means coupled to said internal combustion engine;

comparing said magnitude of vibration monitored by said monitoring step with a reference magnitude to generate a first signal when said magnitude of vibration is larger than said reference magnitude and to generate a second signal when said magnitude of vibration is smaller than said reference magnitude;

incrementing altering an instantaneous timing of spark ignition by incrementally retarding said instantaneous timing by a first predetermined value in response to said first signal and by incrementally advancing said instantaneous timing by a second predetermined value in response to said second signal, said first predetermined value being larger than said second predetermined value; and supplying said internal combustion engine with a spark ignition at a timing of spark ignition corrected by said altering step to control the ignition angle just below the condition where knocking of said engine occurs.

2. A method according to claim 1 further comprising the steps of:

detecting a first rotational position of an output shaft of said internal combustion engine prior to an arrival of a piston of said internal combustion engine at the top dead center position;

detecting a second rotational position of said output shaft indicative of an arrival of said piston at the top dead center position;

integrating said magnitude of vibration monitored by said monitoring step during the rotation of said output shaft from said first to second rotational positions detected by said first and second detecting steps;

integrating a predetermined magnitude during the rotation of said output shaft from said first to second rotational positions detected by said first and second detecting steps;

dividing an integration result of said former integrating step by an integration result of said latter integrating step; and establishing said reference magnitude of said comparing step in proportion to a division result of said dividing step.

3. A method for controlling a timing of spark ignition for an internal combustion engine having a piston comprising the steps of:

detecting operating conditions of an internal combustion engine including engine speed and intake pressure;

determining a first timing of spark ignition for said internal combustion engine in response to said detected operating conditions for deriving maximum torque from said internal combustion engine;

monitoring a magnitude of vibration of said internal combustion by vibration responsive means coupled to said internal combustion engine;

comparing said monitored magnitude of vibration with a reference magnitude, said comparing step providing a first comparison output when said monitored magnitude is larger than said reference magnitude;

correcting an instantaneous timing of spark ignition by retarding said instantaneous timing by a first predetermined value in response to the presence of said first comparison output and by advancing said instantaneous timing by a second predetermined value in response to the absence of said first comparison output, said first predetermined value being larger than said second predetermined value;

comparing said corrected timing of spark ignition with a second timing of spark ignition predetermined irrespective of said detected operating conditions to indicate the maximum degree of ignition spark advance, said comparing step providing a second comparison output when said corrected timing is less advanced than said second timing;

comparing said corrected timing of spark ignition with said first timing of spark ignition, said comparing step providing a third comparison output when said corrected timing is more advanced than said first timing; and supplying said internal combustion engine with a spark ignition at said corrected timing in response to the presence of said second and third comparison outputs, at said second timing in response to the absence of said second comparison output, and at said first timing in response to the absence of said third comparison output to control the ignition angle just below the condition where knocking of said engine occurs.

* * * * *